, 1933

UNITED STATES PATENT OFFICE 1,939,326

MILK AND CREAM PRODUCTS HAVING INCREASED WHIPPING PROPERTIES AND METHOD OF MAKING SAME

Grover D. Turnbow, Davis, Calif.

No Drawing. Application September 9, 1927
Serial No. 218,576

3 Claims. (Cl. 99—60)

This invention relates to milk products possessing to a high degree the property of having incorporated therein and holding air, together with the method of producing the same.

The property possessed by milk and cream or what, for convenience, may be termed lacteal fluids to incorporate and to hold therein materials of a gaseous nature, such as air, is one of considerable importance. Unfortunately, this property is not a constant one in milk or cream, but varies greatly with the seasons of the year, during the period of lactation of cows, and especially with the kind of feed which is being given to the cows. Those who are familiar with milking will recall that at certain seasons of the year milk, as it is drawn from the cows, into the pail, will foam in a profuse manner, while at other times there is no apparent air incorporation and practically no foam whatsoever is produced in the pail. In certain uses of milk or cream, the incorporation and retention of air in the same is not only desirable but also quite necessary. In the ordinary whipping of cream and in the manufacture of ice cream, the important characteristics of the above products are dependent to a great extent upon proper air incorporation. The same is true in the manufacture of bread and certain cakes wherein milk or skimmed milk is used. The capacity to incorporate and hold air in the milk or cream in all of these instances is of considerable importance.

Bearing these difficulties in mind, the present invention seeks to provide an agent with which these lacteal fluids may be treated so as to permit the same to have air incorporated and held therein with comparative ease. In fact, with the present agent or present method, milk or cream which shows little or no tendency to whip or to take up air may be so treated that the whipping thereof or incorporation of air therein may be accomplished without any difficulty whatsoever. This treatment of milk or cream with the present whipping agent may be readily carried to a point wherein the capacity to incorporate and hold air is quite beyond that of untreated milk or cream possessing the best or highest whipping qualities.

As an example of the difficulties heretofore encountered in incorporating air in milk or cream, attention might be called to the method commonly employed in the manufacture of ice cream. In this industry, it is generally recognized that ice cream mixtures can not be frozen at once after having been prepared, but that such mixtures must be held or aged from a period of twenty-four to forty-eight hours, in order that they may reach the condition wherein the desired air incorporation may be obtained. This holding or ageing procedure results in considerable cost, and, in many cases, in a deterioration of the product. Not only are expensive containers, as well as space, which might be at a high rental, required for the necessary storage of such product during ageing, but the deterioration which takes place during such ageing process results in the ice cream possessing poor qualities and less desirable flavoring. In addition, it will be apparent that the time element involved in the manufacture of the ice cream might be said to be at a maximum. What has been said regarding this applies equally to cream used in the preparation of whipped cream.

With the use of the whipping agent and method of using the same disclosed in the present invention, both ice cream and whipped cream may be prepared without any ageing of the product, thereby eliminating the expense and difficulties which necessarily accompany the holding procedure heretofore practiced. Also of prime importance is the fact that the deterioration of the product which is most general when ageing is practiced, is eliminated. With the present method the mixture is capable of taking up and holding air immediately with the greatest facility, so that the expense of storage space and containers for ageing are eliminated, and, furthermore, the time element involved in the production of the ice cream is reduced to a minimum.

It is believed that the tendency of both milk and cream to whip is due, in a large measure, to the proteins, especially the casein, and that probably the casein is affected by certain salts in the milk. Accordingly, the present method contemplates the addition of certain salts, together with the application of heat, with the result that milk, cream, or skimmed milk, after being treated with such salts, may be immediately whipped or otherwise caused to take up and retain as much air as it is desired to have incorporated therein. In fact, the whipping tendency or the tendency to take up and hold air is easily carried far beyond that of any aged or untreated milk or cream. In carrying out the present invention, it has been found that sodium, potassium, and ammonium salts, in combination with those acid radicals in which the affinity between the base and the acid radical is not strong or is less than the affinity between the base and the casein of the milk or cream, have the greatest capacity for facilitating whipping or the incorporation of air. Also, by the use of these substantially neutral salts in the treatment of milk or cream, the acid reaction of the latter, after being treated, is not substantially changed. Apparently, a chemical reaction occurs, the nature of which indicates that the colloid condition of the casein is changed, wherein a smaller colloid particle is produced. In this connection, it might be added that those salts which have been found most desirable are the sodium, potassium and ammonium salts of the relative weak acids, such as sodium, potassium and ammonium citrate, sodium, potassium and ammonium tartrate, or the double tartrate salts as sodium potassium tartrate. Alkaline earth metal salts have been found to be inoperative. In the commercial practice of the invention, sodium citrate has been found to give very satisfactory results.

The procedure, in accordance with the present invention, may be described more in detail as follows:—

To the usual ice cream mix containing the ingredients of cream, milk solids not fat, sugar, gelatin, and flavoring, .35 of 1% of sodium citrate is added, after which the mixture is heated to a temperature of approximately 145° F. and so held for a period of thirty minutes. It is then cooled and immediately it may be frozen. With this procedure, it will be found that the desired percentage of air may be incorporated in the treated milk or cream in much less time and with considerably greater ease than in the case of a similar mixture not containing the sodium citrate, although the latter may be aged in accordance with the prior practices, for a period of from twenty-four to forty-eight hours. In the case of cream, better results seem to be secured if there is added thereto .3 of 1% of sodium citrate and the solution heated to a temperature of approximately 145° F. for a period of thirty minutes. Cream thus treated and cooled may be immediately whipped or have air incorporated therein, the same as in the case of milk, no ageing whatsoever being required in either instance.

In the manufacture of ice cream, even superior results are obtainable by adding to the skimmed milk sodium citrate so that the sodium citrate contained will equal approximately 6.17% of the skimmed milk solids, after which the temperature of the milk is raised and held for thirty minutes at a temperature of 160° F. After having been heated, the skimmed milk is then reduced to a dry powder, preferably with a standard spray drying system. Such skimmed milk, when incorporated in ice cream mixtures, possesses the property of giving to the mixture the capacity to incorporate or hold air with considerable ease. This is especially true when the mixture is heated to 145° F. and held for thirty minutes.

By this plan of first producing the skimmed milk powder treated with sodium citrate, the effect on the ice cream mixture is much more noticeable in its ability to take up air than where the sodium citrate is used directly, as has been outlined. This plan is also believed to be advantageous in that the percentage of sodium citrate necessary to produce the necessary whipping or air incorporation, is reduced. Ice cream manufactured according to any of the foregoing procedures possesses the capacity for air incorporation quite beyond the amount of air which may usually be incorporated, thereby giving to such ice cream an especially desirable characteristic. This is especially true in connection with the making of malted milk or other drinks containing ice cream in which a certain amount of whipping is most desirable. Skimmed milk powder, prepared as heretofore outlined, possesses in itself unusual whipping properties when mixed with water, so that such powder has been found superior in baking, where the incorporation of air during the manufacturing process is desired.

What I claim is:

1. The method of increasing whipping properties of lacteal fluids which consists in adding sodium citrate to the same and applying heat to the mixture.

2. The method of increasing whipping properties of lacteal fluids which consists in adding a soluble salt of an alkali base and a weak acid to the same, and then applying heat to the mixture.

3. A product of lacteal fluid such as milk or cream, containing a soluble salt of an alkali base and a weak acid in such quantities that the colloidal casein particles of the original fluid are reduced in size without increasing the viscosity of the orginal fluid, said product having increased whipping properties as compared with the original fluid.

GROVER D. TURNBOW.